United States Patent

Nann et al.

Patent Number: 5,848,468
Date of Patent: Dec. 15, 1998

[54] METHOD OF FORMING METALLIC CURRENT CONDUCTING LUGS AT ELECTRODE PLATES OF ACCUMULATORS

[75] Inventors: Eberhard Nann, Soest-Deiringsen; Josef Gürtler, Weslarn; Peter Gleuel, Niessetal, all of Germany

[73] Assignee: Hagen Batterie AG, Soest, Germany

[21] Appl. No.: 536,316

[22] Filed: Sep. 29, 1995

[30] Foreign Application Priority Data

Oct. 4, 1994 [DE] Germany .......................... 44 35 454.1

[51] Int. Cl.⁶ .................................................. H01R 43/02
[52] U.S. Cl. .............................................................. 29/879
[58] Field of Search ................................... 429/233, 234, 429/241, 245; 29/879

[56] References Cited

U.S. PATENT DOCUMENTS

| | | |
|---|---|---|
| 4,098,967 | 7/1978 | Biddick et al. . |
| 4,161,569 | 7/1979 | Faber . |
| 4,237,205 | 12/1980 | Matter . |
| 4,476,206 | 10/1984 | Viala et al. . |
| 5,139,902 | 8/1992 | Drews et al. . |
| 5,395,710 | 3/1995 | Imhof et al. . |
| 5,580,685 | 12/1996 | Schenk . |

FOREIGN PATENT DOCUMENTS

| | | |
|---|---|---|
| 653862 | 10/1994 | Australia . |
| 85400 | 8/1983 | European Pat. Off. . |
| 0538645 A1 | 4/1993 | European Pat. Off. . |
| 2330519 | 1/1975 | Germany . |
| 4225708 C1 | 9/1993 | Germany . |
| 55-133770 | 10/1980 | Japan ....................... 429/234 |

OTHER PUBLICATIONS

Patent Abstracts of Japan, E–699, Dec. 27, 1988, vol.12, No. 500 & JP–63–211568, Abstract.
Patent Abstracts of Japan, E–771, Jun. 12, 1989, vol. 13, No. 251 & JP 1–50362, Abstract.
Patent Abstracts of Japan, E–264, Sep. 6, 1984, vol. 8, No. 194 & JP 59–83350, Abstract.

*Primary Examiner*—Carl J. Arbes
*Attorney, Agent, or Firm*—Townsend and Townsend and Crew LLP

[57] ABSTRACT

A method of forming metallic current conducting lugs on an accumulator electrode plate wherein at least the region where the current conducting lug has to be formed comprises a plastic net structure which is preferably provided with a metallization which conducts electricity well, in particular of copper, which is in turn provided with a tin or lead/tin coating and/or a lead coating or a lead alloy coating. Metal strips of an alloy which melts at low temperature are applied to the two oppositely disposed surfaces of the plastic net structure in the region of the current conducting lug which is to be formed. The strips cover over at least the upper region of the current conducting lug which is to be formed. The two metal strips are pressed together from the flat sides with a high pressure while clamping the plastic net structure, preferably while being heated to a temperature which at least softens the metal strips, and preferably melts them at the edges but does not yet allow the plastic net structure to be melted or decomposed. The metal of the metal strips flows into the plastic net structure and the two metal strips are connected together at least at the edges, but preferably also in the interior of the plastic net structure.

36 Claims, 3 Drawing Sheets

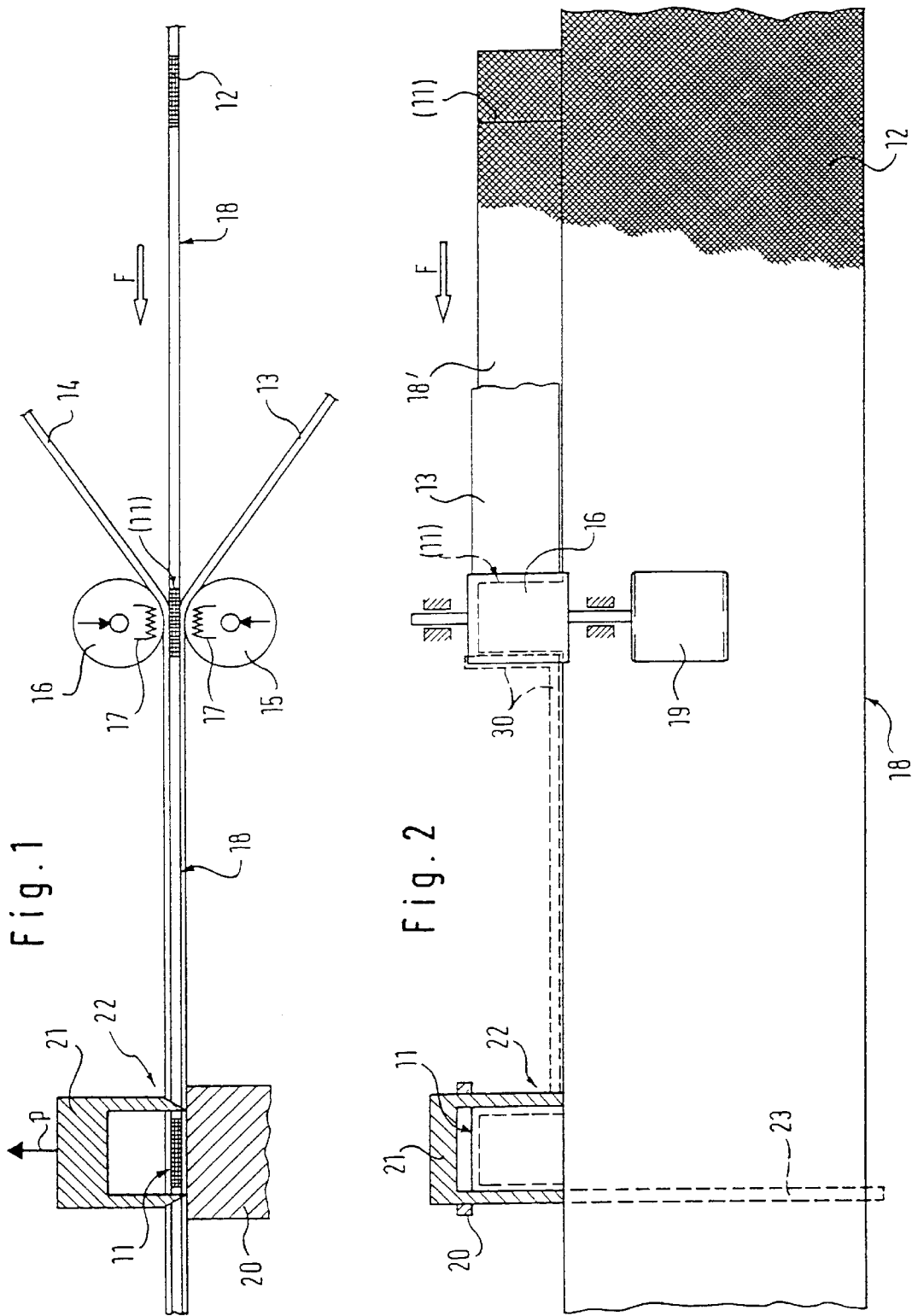

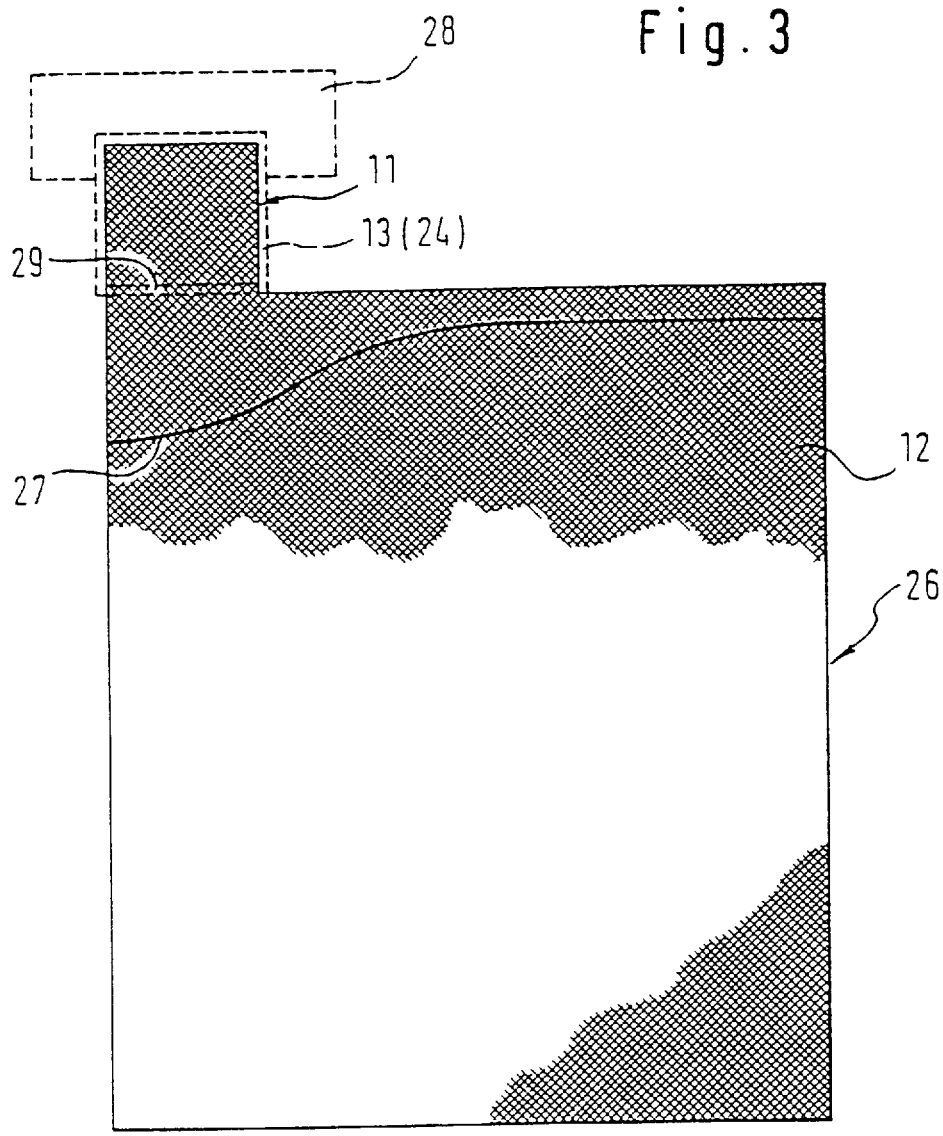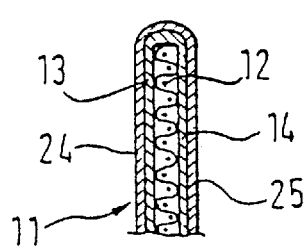

METHOD OF FORMING METALLIC CURRENT CONDUCTING LUGS AT ELECTRODE PLATES OF ACCUMULATORS

BACKGROUND OF THE INVENTION

The invention relates to a method for the forming of metallic current conducting lugs on an electrode plate wherein at least the region where the current conducting lug is to be formed comprises a plastic net structure. However, the entire electrode plate preferably comprises a plastic net structure.

In order to be able to connect the individual electrode plates of the same polarity of one or more cells in parallel with one another economically, and with little increase of the internal electrical resistance during the manufacture of accumulators on a large series production scale, the current conducting lugs of the electric plates of the same polarity, which are arranged parallel to and spaced apart from one another, are generally immersed in liquid lead or in a liquid lead alloy (for example in accordance with the COS-method) in order to electrically connect together the current conducting lugs of the individual electrode plates of the same polarity through a lead bridge or a lead alloy bridge. This known method for the electrical connection of the current conducting lugs is problematic when the base material consists of plastic, in particular of a plastic net structure such as that disclosed in DE 39 22 424 C2. By heating the plastic to a temperature of, for example, above 250° C., which can easily arise on dipping it into a lead melt, the plastic of the plastic net structure melts and decomposes so that hollow cavities form in the lead bridges into which acid can enter. In this way the copper which coats the plastic net structure corrodes and can also enter the electrolyte where it reduces the hydrogen overpotential and this leads to a breakdown of the cell.

In an accumulator cathode grid (JP-A-63-211568) which is manufactured from a synthetic resin foil laminated on both sides with a lead alloy and then subjected to a stretching process, the current conducting lug can be coated with synthetic resin, lead or a lead alloy to reduce corrosion. It is not however stated how the lead or the lead alloy is applied.

SUMMARY OF THE INVENTION

The object of the invention is to provide a method of forming metallic current conducting lugs an electrode plate in which a stable, massive and largely metallic current conducting lug can be formed when using plastic as a base material for the electrode plates, and in particular for the current conducting lug of the same, onto which a current conducting bridge of lead or of a lead alloy can be cast without problem, without the danger of the plastic decomposing or melting.

The concept underlying the invention is that one presses metals of an alloy which melts at a low temperature against one another at high pressure from both sides of the plastic net structure while clamping the plastic net structure whereby the metal, despite the relatively low temperature, flows plastically into the intermediate spaces of the plastic net structure and there forms an intimate bond with the metal coating of the plastic and the metal of the same kind which is flowing in from the opposite side.

Important for the method of the invention is that the starting material is a narrow meshed net of plastic, in particular in the area of the current conducting lug which has already been made conductive through the application, in particular the galvanic application, of an electrically well conducting metallization, in particular of copper, and has been rendered stable against corrosion by the subsequent application of a layer of a lead/tin alloy and/or of lead or of a lead alloy. Through the method of the invention the pressed-on metal strips are not only connected together through the meshes of the plastic network but are also metalically connected with the lead/tin alloy and/or the lead or the lead alloy present on the copper plating of the plastic net structure. The plastic net structure and also the metal layers and metal strips applied to it thus form a uniform compound body in the region of the current conducting lug.

In one embodiment the metal strips project at the free edges of the current conducting lug beyond the plastic net structure, and are either cut after pressing approximately to the size of the current conducting lug, in particular by a stamping procedure, or are folded as a unit around one edge, preferably the upper edge of the current conducting lug, and are then pressed and are in particular cut to size at the free edges by a stamping procedure insofar as this is still necessary. This embodiment is particularly advantageous because the superfluous metal is recovered as recyclable waste. Moreover, the stamping process has the advantage that the metal strips which overlap the plastic lug width by a minimal amount are additionally pressed against one another at the side edges as result of the shearing forces. It is also possible to cut the metal strips applied to the current conducting lug regions of the plastic net structure from the outset in such a way that they exactly fit onto the current conducting lug regions and preferably project a little on all sides in order to fully cover over the plastic net structure on all sides.

Through the method of the invention, metallic, electrical current conducting lugs are achieved with very low tolerances with respect to thickness and width which effectively protect the plastic material that is to be encased from the access of electrolyte, which are very stable and which, moreover, permit problem-free connection to other electrode plates of the same or of further cells.

It is particularly preferred when the pressing process is continuously carried out between two rolls. This embodiment is suitable for large series production.

When, further metal strips of a metal with a substantially higher melting point are applied in a subsequent method step on both sides the plastic net structure is already protected by the previously pressed-on metal of low melting point. The increased heat supplied by the metal bands with the higher melting point is partly used up for the surface melting of the lower lying layer of low melting point metal. Accordingly, in this embodiment, the low melting point metal is not only closely meshed with the plastic but rather the higher melting point metal is also tightly meshed with the lower melting point metal layer.

The use of the cast on COS structure (the current conducting bridge) for electrodes of plastic structure is possible in this manner. Since the possibility already exists nowadays of obtaining surface melting of the lugs, while preventing melting away of the lugs, by skilled execution of the method, lugs prepared in accordance with the above method can likewise be used.

In order to also be able to carry out the method in a sensible manner economically two thin metal bands or strips comprising an easily deformable and low melting point metal or metal alloy are supplied in sandwich-like manner to the plastic net current conducting lug region which is to be reinforced. The band of joined together electrode plates or grids which moves with a continuous speed of advance and the metal strips which are transported with the same speed are passed under a rotating, heated, contact pressure roll. During this procedure the metal of the metal strips becomes firmly embedded in the net-like electrode plates as a result of the high pressure and the elevated temperature.

Through the local heating of the applied metal strips, in particular in the region of their edges, an all-around hermetic seal is achieved which effectively prevents the penetration of acid but simultaneously also does not bring about the danger of melting or decomposition of the plastic, because care has been taken through the heating, which only takes place locally, that the heat required for the short-period melting is rapidly distributed into the surrounding non-heated regions.

As an alternative or supplement to the pressing of low melting point metal from both sides into the plastic net structure a reinforced and current conducting lug of particularly good conductivity can also be achieved. Through the more intensive copper plating of the plastic net structure at the current conducting lug and in the regions which surround it, one obtains not only a better direct protection of the underlying plastic net structure against heating when casting on the lead bridges, but also a rapid dissipation is achieved of the heat of the cast-on lead into the neighboring regions of the current conducting lug. The additional copper plating should preferably take place prior to the application of the lead-tin and/or lead or lead alloy coating.

The additional copper coating should preferably take place before the application of the lead-tin and/or lead or lead alloy coating. With a lead coating or lead alloy coating of 0.5 to 1.00 mm it is possible to dispense with the additional metal strips. With thinner lead or lead alloy coatings the metal strips should be additionally rolled on.

In another embodiment two electrode plates with the current conducting lugs lying on the same inner side are cut out or stamped out from a single broad band. Such embodiment has the advantage that twice the quantity of electrode plates can be manufactured per unit of time with the same speed of advance inside the pressing and stamping device. Furthermore, the cutting waste in this region is reduced when the stamped-out current conducting lugs are offset in the transport direction and are arranged on the same strip.

Another embodiment ensures a particularly reliable closing of the meshes. The tin alloy used for the immersion bath should have a melting temperature at which no decomposition of the plastic net structure takes place, but solely a melting or softening of the surface thereof.

The invention also has as its subject an accumulator electrode plate manufactured in accordance with the method of the invention.

BRIEF DESCRIPTION OF THE DRAWINGS

FIG. 1 is a schematic side view of a plant for carrying out the method of the invention, FIG. 2 is a plan view of the plant of FIG. 1, FIG. 3 is a plan view of an electrode plate of a plastic net structure processed in accordance with the method of the invention, FIG. 4 is an enlarged sectional view of a metallized current conducting lug in accordance with the method of the invention.

DESCRIPTION OF THE PREFERRED EMBODIMENTS

Figure 5:
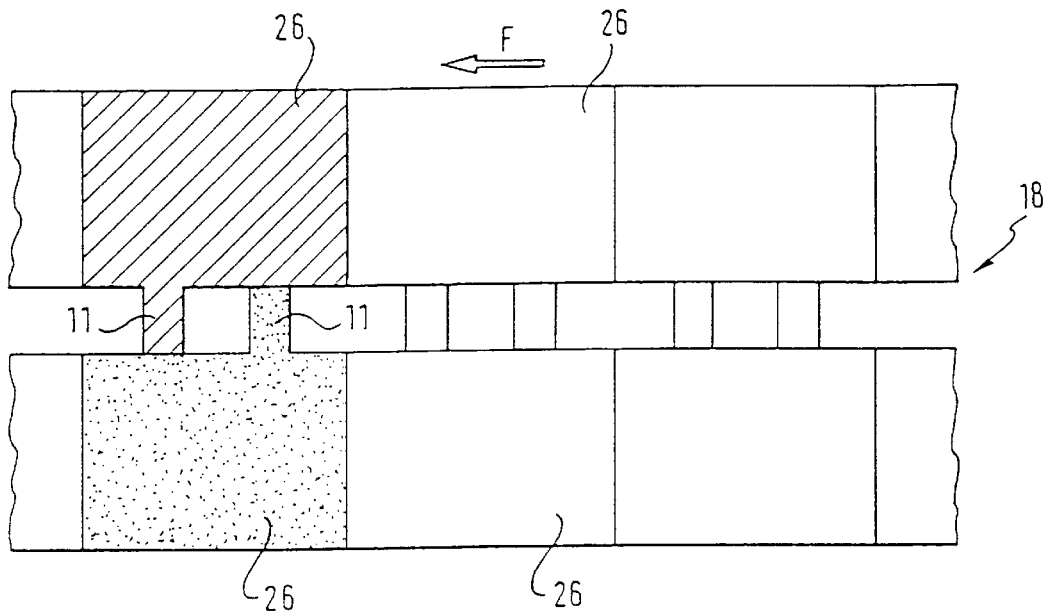
FIG. 5 is a plan view of an embodiment of a double band plastic net structure in accordance with the method of the invention, FIG. 6. is a plan view of another embodiment of a double band plastic net structure in accordance with the method of the invention.

In accordance with FIGS. 1 and 2 a band 18 of a plastic net structure 12 from which accumulator electrode plates are cut out in accordance with FIG. 3 is conveyed in the direction of the arrow F continuously with a predetermined speed. The current conducting lugs 11 are later formed at the upper marginal strip 18' of the band 18 in FIG. 2. The plastic net structure 12 is preferably already copper plated in accordance with DE 39 22 424 C2 and provided with a lead-tin layer and/or a lead layer and/or a lead alloy layer. The band 18 which includes the plastic net structure 12 is passed between two correspondingly arranged pressure rolls 15, 16 and indeed together with two elongate metal strips 13, 14 of a metal which melts at a low temperature, such as for example PbSn, which are supplied from below and above, respectively. The metal strips 13 and 14 and the plastic net structure 12 thus form a sandwich arrangement between the rolls 15, 16.

The rolls 15, 16 are each provided with a heating device 17 which permits the rolls 15, 16 to be heated to such a temperature that the metal strips 13, 14 soften. The plastic of the band 18 is however not damaged.

As indicated by the arrows at the shafts of the rolls 15, 16 in FIG. 1 the two rolls 15, 16 can be pressed towards each another with a high pressure of, for example, 30 bar.

In accordance with FIG. 2 the upper roll can be so set in rotation by a motor transmission arrangement 19 that the sandwich arrangement comprising of the band 18 and the metal strips 13, 14 is conveyed between the rolls 15, 16 in the direction of the arrow F.

A stamping arrangement 22, including of a table 20 arranged beneath the band 18 and a stamping tool 21, is located behind the roll pair 15, 16 in the conveying direction F, with the stamping arrangement 22 being illustrated during the stamping procedure in FIG. 1. In general, however, the stamping tool 21 is located in a position raised in the direction arrow p from the band 18 so that the advance of the band 18 in the forwarding direction F is not hindered by the stamping arrangement 22. In place of an upwardly and downwardly moving stamping tool 21 a continuously operating stamping roll can also be provided.

In accordance with FIG. 2 the stamping device 22 can also be extended by cutting tools 23, 30 which extend transversely over the band 18 or along the upper edge of the electrode plates to be formed and which serve for the cutting of the band 18 into individual electroplates 26 (FIG. 3) which respectively have a current conducting lug 11. The cutting tools can also be provided optionally to produce continuously operating stamping or cutting rolls.

The manner of operation of the described arrangement is as follows:

When the strip 18' of the band 18 provided for the current conducting lugs 11 is clamped between the two metal strips 13, 14 at the roll pair 15, 16, the rolls of which are pressed against one another, then the low melting point metal flows plastically into the hollow cavities and intermediate spaces of the plastic net structure 12 and the two oppositely disposed metal strips 13, 14 are also plastically connected to one another.

A compact, compound body comprising of the pressed together metal strips 13, 14 and the plastic net structure 12 thus emerges out of the roll pair 15, 16. In similar manner two further metal strips can be pressed by means of a further roll pair not illustrate in FIGS. 1 and 2 onto this sandwich arrangement.

As soon as this composite body has reached the stamping device 22 it is brought, either very quickly or after short-time stopping of the band 18, downwardly against the table 20 into the stamping position which can be seen from FIG. 1 where the superfluous metal which projects forwardly and rearwardly beyond the current conducting lug 11 is stamped away. At the same time, or previously, the cutting tools 23, 30 which are only indicated in broken lines should cut the electrode plates 26 to the shape which can be seen from FIG. 3. The cut-off pairs of metal strips between two sequential current conducting lugs 11 can be recycled, i.e. can again be used for the formation of new metal strips 13, 14.

Directly after the stamping-out process the stamping tool 21 is raised again so that the advance of the band 18 in the conveying direction F can be continued. The stamping and cutting tools are however preferably realized by continuously running punching or cutting rolls.

As an alternative to two right cylindrical rolls 15, 16 one or both rolls 15, 16 could also be eccentrically designed in accordance with the invention. The diameter of the rolls 15, 16 should then to be selected in such a way that the roll regions which have the greatest radial extent jointly just form the roll gap when a region of the plastic net structure at which the current conducting lug 11 is to be formed is directly located in the roll gap.

In this way a situation is achieved in which a high pressing force is only obtained when the current conducting lug/plastic net structure area 12 is located between the rolls 15, 16. In the remaining rotational positions of the rolls 15, 16 no pressing force is exerted onto the metal strips 13, 14.

Following the stamping tool 21 there is preferably provided a soldering or welding station in which the peripheral edges of the metal strips applied to the current conducting lug 11 are locally heated and are so tightly connected together by soldering or welding that in later use no acid can penetrate from the outside into the space bounded by the metal strips.

The heating can take place ultrasonically or by another method that permits local heating.

In FIG. 3 it is indicated how the current conducting lug 11 (FIG. 4) which is provided with the metal strips 13, 14 and 24, 25, which are only indicated in broken lines, can be subsequently cast around with a current conducting bridge 28 comprising lead which is also indicated in broken lines. Thereafter, the current conducting bridge 28 is only located in the upper region of the current conducting lug 11, whereby the heat which arises during casting can be distributed to the lower lying regions of the metal strips 13, 14 and 24, 25 respectively, which do not come into contact with the molten metal of the current conducting bridge 28.

In FIG. 3, 29 designates that region at the foot of the current conducting lug 11 along which a local soldering or welding of the metal strips 13, 14 or 24, 25 provided at opposite sides of the current conducting lug 11 takes place as a result of local heating. Soldering or welding should also be effected at the free edges of the current conducting lug 11.

Instead of applying metal strips 13, 14 or 24, 25 to the current conducting lugs 11 the latter can also be covered with one or more copper layers, for example electrolytically applied copper layers, which are together so thick that during casting on of the current conducting bridge 28 no melting or decomposition of the plastic in the plastic net structure 12 occurs.

In this embodiment it is expedient for the additional copper layer or layers applied before tinning and/or leading to be applied not only in the region of the current conducting lug 11 but also in the upper region of the plate part of the electrode plate 26 approximately up to the boundary 27 in FIG. 3, with a continuous transition being preferred from the additional copper plating up to the normal copper plating of the larger part of the electrode plate 26. This measure not only ensures a better distribution of the heat which arises during casting on of the current conducting bridge 28 but also a lower resistance of the electrode plate 26 in the region of the current conducting lug 11 and the regions of the electrode plate at which it opens out. This is in particular important because the current density during the discharge of starter batteries in particular is largest in these areas.

If necessary a better copper plating in the area of the current conducting lug 11 and the application of one or more metal strips by pressing them on can also be combined.

FIG. 4 shows a current conducting lug in cross-section which is provided with metal strips 13, 14 and 24, 25 respectively in accordance with a discontinuous method.

In this case the metal strips 13, 14 comprise of one piece and are turned around the upper edge of the plastic net structure 12 forming the current conducting lug 11 and are then pressed against one another from both sides. A further unitary metal strip is then turned around this inverse U-shaped arrangement of the metal strip 13, 14 and forms metal strips 24, 25 on both surfaces. These metal strips 24, 25 are also pressed from opposite sides against the lower lying metal strip 13, 14 and the plastic net structure 12. The soldering or local welding of the individual metal strips 13, 14, 24, 25 to one another is then preferably effected at the initially open lateral and lower edges.

The advantage of turning the metal strips 13, 14 and 24, 25, which are formed as single bands, over the upper edge of the current conducting lug 11 lies in the fact that a particularly good protection of the plastic net structure 12 is ensured in the region of the upper edge where the current conducting bridge 28 (FIG. 3) is cast on.

Figure 6:
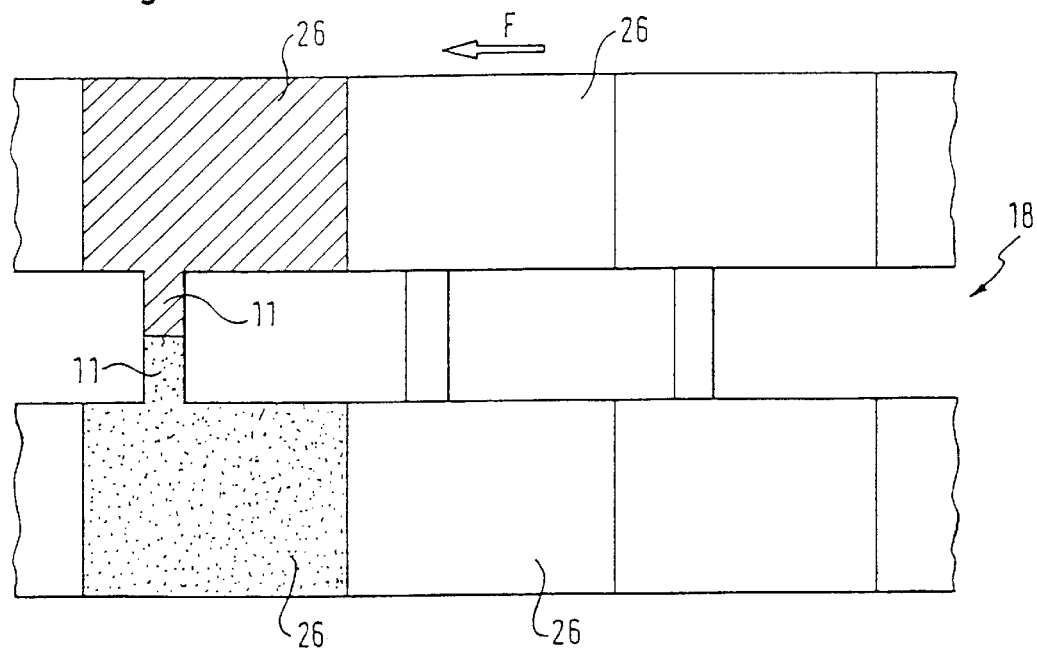

FIGS. 5 and 6 show plan views of a double band plastic net structure 18 which has a width such that two electrode plates 26 lying alongside one another and each having one current conducting lug 11 can be formed by each respective cutting or stamping process. In the embodiment of FIG. 5 the two current conducting lugs 11 of a cut-out lie behind one another in the forwarding direction F, whereas in the embodiment of the method of FIG. 6 they lie alongside one another as seen in the conveying direction F and are to be separated from one another during the subsequent cutting and stamping procedure. The application of the metal strips 13, 14 and 24, 25 takes place analogously to FIGS. 1 and 2.

The methods of FIGS. 5 and 6 have the advantage that the output of finished electrode plates is doubled for the same speed of advance and, on the other hand, the proportion of metal and plastic waste is more than halved in comparison to the use of a single band in accordance with FIGS. 1 and 2.

The mesh size of the plastic net structure may amount to 0.5 to 10 mm$^2$ in the lug region. The thickness of the copper layer should amount to 0.01 to 0.5 mm in the lug region and to 0.1 to 100 $\mu$m in the remaining plate region. The lead-tin layer deposited thereon may have a thickness of 1 to 20 $\mu$m, and the lead/lead alloy layer deposited thereon may have a thickness of 0.01 to 1 mm, with the greater layer thickness only being required in the lug region. The thickness of the applied metal strips 13, 14 may be about 3 mm whereby a total thickness of the current conducting lug 11 is obtained of circa 6 mm.

What is claimed is:

1. A method of forming metallic current conducting lugs on an accumulator electrode plate wherein at least the region where each current conducting lug is to be formed comprises a plastic net structure which includes a tin or lead/tin coating and/or a lead coating or a lead alloy coating, the plastic net structure having two oppositely disposed surfaces and a plurality of edges which include a pair of opposite free edges, the method comprising the steps of:

applying two metal strips of an alloy which melts at low temperature with flat surfaces of the metal strips to the two oppositely disposed surfaces of the plastic net structure in the region of the current conducting lug which is to be formed, with the metal strips covering over at least the upper portion of the region where the current conducting lug is to be formed; and pressing the two metal strips toward one another clamping the plastic net structure with a high pressure to soften and cause the two metal strips to flow through the plastic net structure and connect with one another at least adjacent edges of the metal strips, the plastic net structure having a sufficiently high melting temperature to prevent melting and decomposition under the high pressure.

2. The method of claim 1, wherein the plastic net structure includes a metallization which conducts electricity well.

3. The method of claim 2, wherein the metallization includes copper.

4. The method of claim 1, further comprising the step of heating the two metal strips to a temperature which at least softens the metal strips.

5. The method of claim 4, wherein edges of the metal strips are melted at the temperature.

6. The method of claim 1, wherein the two metal strips connect with one another through an interior of the plastic net structure during the pressing step.

7. The method of claim 1, wherein the two metal strips include tin or a lead/tin alloy.

8. The method of claim 7, wherein the lead/tin alloy comprises a lead component of up to about 50%.

9. The method of claim 1, wherein portions of the two metal strips project beyond the pair of opposite free edges of the plastic net structure where the current conducting lug is to be formed, the method further comprising the step of cutting the projected portions of the two metal strips after the two metal strips are pressed approximately to the size of the current conducting lug in the pressing step.

10. The method of claim 9, wherein the step of cutting comprises stamping out the projected portions.

11. The method of claim 10, wherein the current conducting lugs are formed on a continuously advanced band of joined-together electrode plates of the plastic net structures and the step of cutting the projected portions comprises cutting the continuously advanced band and separating the electrode plates.

12. The method of claim 1, wherein portions of the two metal strips project beyond the pair of free edges of the plastic net structure where the current conducting lug is to be formed, the method further comprising the steps of folding the projected portions as a unit around an edge of the current conducting lug and pressing the unit.

13. The method of claim 12, further comprising the step of cutting remaining projected portions from the pair of free edges.

14. The method of claim 1, wherein the pressing step comprises continuously supplying the accumulator electrode plate with the plastic net structure and the two metal strips between two rolls which press the two metal strips together.

15. The method of claim 14, wherein at least one of the two rolls is heated.

16. The method of claim 1, wherein the pressing step is carried out at a temperature between about 100° C. and 120° C.

17. The method of claim 16, wherein the high pressure in the pressing step is at least about 20 bar.

18. The method of claim 17, wherein the high pressure in the pressing step is between about 25 and 35 bar.

19. The method of claim 18, wherein the high pressure in the pressing step is about 30 bar.

20. The method of claim 1, further comprising the steps of:

applying to the current conducting lug with flat surfaces of two additional metal strips of an alloy which melts at a temperature substantially higher than the melting temperature of the two metal strips already pressed onto the plastic net structure to form the current conducting lug; and pressing the two additional metal strips toward one another against the current conducting lug, the two additional metal strips supplying heat to melt the two metal strips with the low melting temperature to connect the two metal strips with the two additional metal strips.

21. The method of claim 20, wherein the two additional metal strips comprise lead or a lead alloy.

22. The method of claim 21, wherein the lead alloy comprises up to about 3% tin.

23. The method of claim 20, further comprising the step of soldering or welding edges of the additional metal strips subsequent to the step of pressing the two additional metal strips.

24. The method of claim 1, further comprising the step of locally heating the two metal strips in restricted regions to fuse the two metal strips during or after the step of pressing, wherein heat in the restricted regions generated by the locally heating is adequately quickly distributed to remaining regions of the two metal strips to avoid melting and decomposition of the plastic net structure.

25. The method of claim 24, wherein the step of locally heating is performed with ultrasonics, electrical induction, eddy-currents, or microwaves.

26. The method of claim 24, wherein the step of locally heating is performed along edges of the two metal strips.

27. The method of claim 24, wherein the step of locally heating is performed at a foot of the current conducting lug.

28. The method of claim 1, wherein, prior to the coating of the tin or lead/tin and/or lead or lead alloy, the plastic net structure is coated with copper to form a thick copper coating, and the area adjacent the region where the current conducting lug opens out to the plate part is made thicker by a copper coating.

29. The method of claim 1, wherein the plastic net structure comprises a mesh which includes openings which are narrower in the region where the current conducting lug is to be formed than a remaining region of the electrode plate.

30. The method of claim 29, wherein the openings of the mesh are narrower in a region where the current conducting lug opens out to the plate part.

31. The method of claim 29, wherein each opening of the mesh has a size of about 0.5 to 10 mm$^2$ in the region where the current conducting lug is to be formed and a size of about 5 to 50 mm$^2$ in the remaining region of the electrode plate.

32. The method of claim 1, further comprising the step of casting a current conducting bridge only around an upper region of the current conducting lug.

33. The method of claim 32, wherein the current conducting bridge comprises lead or a lead alloy.

34. The method of claim 1 wherein the plastic net structure comprises open meshes, the method further comprising, prior to the step of applying the two metal strips, the steps of:

metallizing the plastic net structure with a metallization which conducts electricity well;

coating the metallized plastic net structure with tin or lead-tin and/or lead and/or a lead alloy; and filling the open meshes of the metallized plastic net structure by a dipping process in a bath of tin or a lead-tin alloy.

35. A method of forming metallic current conducting lugs on inner sides of a pair of accumulator electrode plates wherein at least the region where each current conducting lug is to be formed comprises a plastic net structure which includes a tin or lead/tin coating and/or a lead coating or a lead alloy coating, the plastic net structure having two oppositely disposed surfaces and a plurality of edges which include a pair of opposite free edges, the method comprising the steps of:

applying two metal strips of an alloy which melts at low temperature with flat surfaces of the metal strips to two oppositely disposed surfaces of the plastic net structure in the region of each current conducting lug which is to be formed, with the metal strips covering over at least the upper portion of the region where the current conducting lug is to be formed;

pressing the two metal strips toward one another clamping the plastic net structure with a high pressure to soften and cause the two metal strips to flow through the plastic net structure and connect with one another at least adjacent edges of the metal strips, the plastic net structure having a sufficiently high melting temperature to prevent melting and decomposition under the high pressure; and stamping out the current conducting lugs after the two metal strips are pressed approximately to the size of the current conducting lug.

36. The method of claim 35, wherein the current conducting lugs on the pair of accumulator electrode plates are formed on a continuously advanced band of joined-together electrode plates of the plastic net structures, the step of stamping comprising stamping out each of the current conducting lugs from the continuously advanced band.

\* \* \* \* \*